United States Patent [19]

Senoh

[11] Patent Number: 4,730,373
[45] Date of Patent: Mar. 15, 1988

[54] MACHINE TOOL FOR MULTIPLE SURFACE MACHINING

[75] Inventor: Atsushi Senoh, Anjo, Japan

[73] Assignee: Washino Engineering Company, Limited, Japan

[21] Appl. No.: 938,352

[22] Filed: Dec. 4, 1986

Related U.S. Application Data

[63] Continuation of Ser. No. 716,927, Mar. 28, 1985, abandoned.

[30] Foreign Application Priority Data

Mar. 30, 1984 [JP] Japan ................................. 59-060883

[51] Int. Cl.$^4$ ............................................. B23P 23/02
[52] U.S. Cl. ..................................... 29/26 A; 29/565; 82/2 D; 82/3; 408/38; 408/39; 408/46; 408/53; 409/202; 409/212; 409/227
[58] Field of Search .................. 408/31, 38, 39, 42, 408/46, 49, 50, 53; 29/26 A, 27 R, 565; 409/160, 165, 202, 203, 204, 205, 212, 224, 227, 240; 82/2 D, 3 R

[56] References Cited

U.S. PATENT DOCUMENTS

| | | | |
|---|---|---|---|
| 2,393,696 | 1/1946 | Kraut et al. | 409/212 |
| 3,746,459 | 7/1973 | Kindelan | 408/37 |
| 3,977,804 | 8/1976 | Kitagawa | 408/42 |
| 4,309,809 | 1/1982 | Ajohoe et al. | 29/26 A |

FOREIGN PATENT DOCUMENTS

| | | | |
|---|---|---|---|
| 2507662 | 9/1976 | Fed. Rep. of Germany | 408/46 |
| 475078 | 10/1952 | Italy | 408/50 |
| 28791 | 3/1977 | Japan | 408/31 |
| 157412 | 12/1980 | Japan | 408/31 |

*Primary Examiner*—Gil Weidenfeld
*Assistant Examiner*—Daniel W. Howell
*Attorney, Agent, or Firm*—Wigman & Cohen

[57] ABSTRACT

The invention relates to a machine tool for multiple surface machining having a work supporting device provided on a base and having a work supporting portion which is freely rotatable and freely adjustable in a vertical position, a slide base freely adjustably movable on the base in a horizontal direction toward and away from the work supporting device, a tool supporting table provided on the slide base, the tool supporting table being freely adjustably movable in a horizontal direction orthogonal to the direction of movement of the slide base, a vertical machining device mounted on the tool supporting table to perform machining from the upper direction on a workpiece that is supported by the work supporting portion, and a plurality of horizontal machining devices mounted on the tool supporting table to perform machining on the workpiece from the horizontal direction.

2 Claims, 4 Drawing Figures

MACHINE TOOL FOR MULTIPLE SURFACE MACHINING

This is a continuation of co-pending application Ser. No. 716,927 filed on Mar. 28, 1985, now abandoned.

BACKGROUND OF THE INVENTION

1. Field of the Invention

This invention relates to a machine tool in which machining is performed on a workpiece using proper working tools such as cutting tools, drills, reamers, milling cutters, or other turning tools or grinding tools, and more particularly, relates to a machine tool for multiple surface machining in which machining can be performed on a plurality of surfaces of the workpiece from a plurality of directions.

2. Description of the Prior Art

As for a machine tool which is capable to machine a top surface and left and right surfaces of a workpiece from the upward direction and the left and right directions, there are known such machines as a planomiller, or a machining center in which its machining head is changeable to a horizontal or a vertical direction. A planomiller aims to machine a relatively large workpiece, and its machine head is large and it is an extremely bulky machine. The positioning of the workpiece is made by longitudinally moving a bed bearing the workpiece. The machining of the workpiece is performed by a plurality of machining heads supported on a gate type column, with spindles extending towards the direction of the workpiece. As a result, a turning operation as well as a rotary indexing of the workpiece are difficult. Moreover, it is not desirable for machining a relative small workpiece efficiently and with high precision.

On the other hand, for example, in a special machining center, although, by providing a plurality of working tools, various machining functions can be performed, a turning operation is difficult. Also, since it is provided with an automatic tool change device, its mechanism and control become complex, and there is a problem that considerable time is consumed for tool change. Furthermore, in order to machine the workpiece from a plurality of directions, a complicated mechanism is required in order to shift the machining head between a horizontal condition and a vertical condition. As a result, there is a problem that it is not easy to maintain machining accuracy.

SUMMARY OF THE INVENTION

The first object of this invention is to provide a novel machine tool for multiple surface machining in which a workpiece can be machined from a plurality of directions with a relatively simple construction.

The second object of this invention is to provide a novel machine tool for multiple surface machining in which a workpiece can be machined from a plurality of directions and in which a turning operation can be performed on the workpiece.

The third object of this invention is to provide a novel machine tool for multiple surface machining in which, in case of machining a workpiece from a plurality of directions, a plurality of types of machining can be performed from a plurality of directions without the need of tool change.

In order to achieve the objects described above this invention is characterized in that a work supporting device is mounted on a base, the work supporting device having a work supporting portion which is freely rotable and freely adjustable in a vertical position; a slide base is mounted on the base, the slide base being freely adjustably movable in a horizontal direction towards and away from the work supporting device; a tool supporting table is mounted on the slide base, the tool supporting table being freely adjustably movable in a horizontal direction orthogonal to the direction of movement of the slide base; and a vertical machining device which performs machining from the upward direction on a workpiece that is supported by the work supporting portion and a plurality of horizontal machining devices which perform machining on the workpiece from the horizontal direction are mounted on the tool supporting table.

DESCRIPTION OF THE PREFERRED EMBODIMENTS

Figure 1:
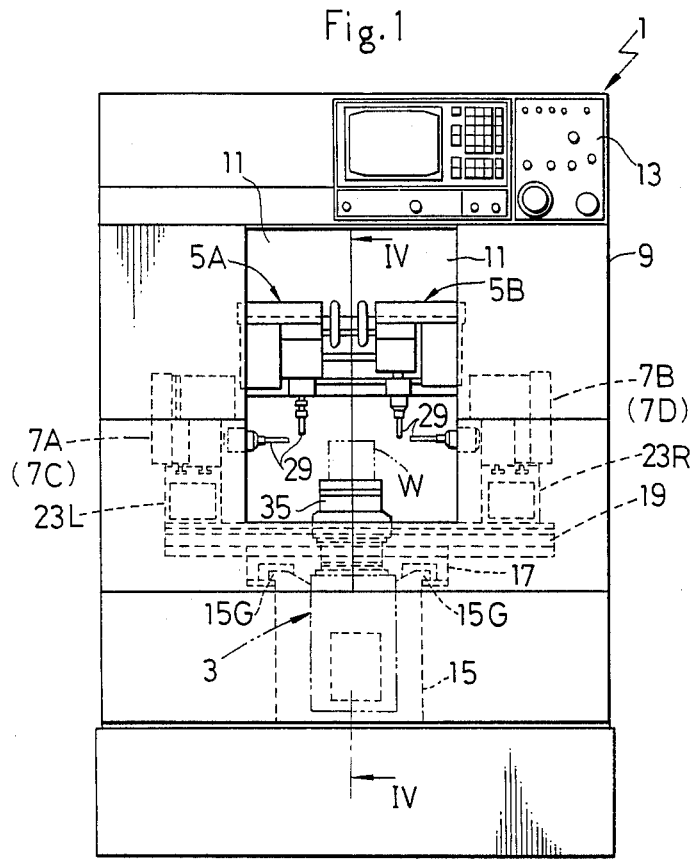
FIG. 1 is a front view of a machine tool for multiple surface machining in accordance with the present invention.
Figure 2:
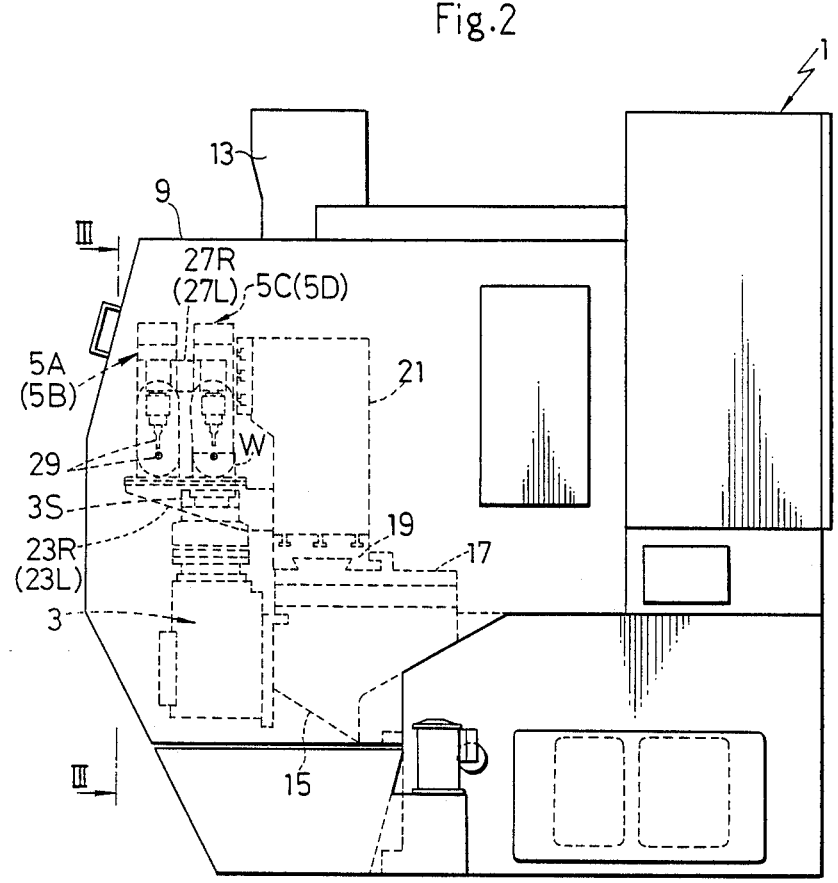
FIG. 2 is a right side view of FIG. 1.

Referring to FIGS. 1 and 2, an embodiment of a machine tool for multiple surface machining 1 according to the present invention is generally constructed with a plurality of vertical machining devices 5A, 5B, 5C and 5D which perform machining from the vertical direction on a workpiece W which is supported on work supporting device 3, and a plurality of left and right horizontal machining devices 7A, 7B, 7C and 7D which perform machining on the workpiece from the horizontal direction. The above described work supporting device 3, a plurality of vertical machining device 5A, 5B, 5C and 5D, and a plurality of horizontal machining devices 7A, 7B, 7C and 7D are enclosed in a cover 9 of sheet member construction, the front of this cover being provided with a transparent opening and closing plate 11 which can be freely opened or closed through such member as a hinge. Also, at the top of the cover, there is mounted a numerical control device 13 in order to fully automatically control the machine tool 1 for multiple surface machining.

More particularly, inside the cover 9 there is disposed a properly shaped base 15, the front end portion of this base 15 being mounted with the previously described work supporting device 3. The operation of this work supporting device 3 is controlled by the previously described numerical control device 13. The work supporting device 3 bears on a freely rotatable vertical spindle (not shown) which is provided, at its top end with a scroll chuck 3S that freely grasps the workpiece W. Although a detailed drawing has been omitted the above spindle is provided with, for instance, a dog to actuate an original point identifying switch such as a limit switch or proximity switch, in order to detect an initial point position of a rotary angle of the spindle, and is also interconnected with a rotary position detecting device such as a pulse encoder. In other words, the above spindle is so constructed as to be able to detect the rotary position from an initial point position, and thus is able to index the workpiece in an optional rotary angle. Also, the above spindle is secured on a slide base, and the position of the slide base is adjusted by a ball screw mechanism or a rack and pinion mechanism which is driven such as by a pulse motor or a servo motor, which in turn is controlled by the numerical control device 13.

Namely, by the work supporting device 3 the workpiece W is free to rotate horizontally and the rotary angle is freely indexed, and further, it is free to move vertically as well as to adjust its vertical position freely.

Figure 3:
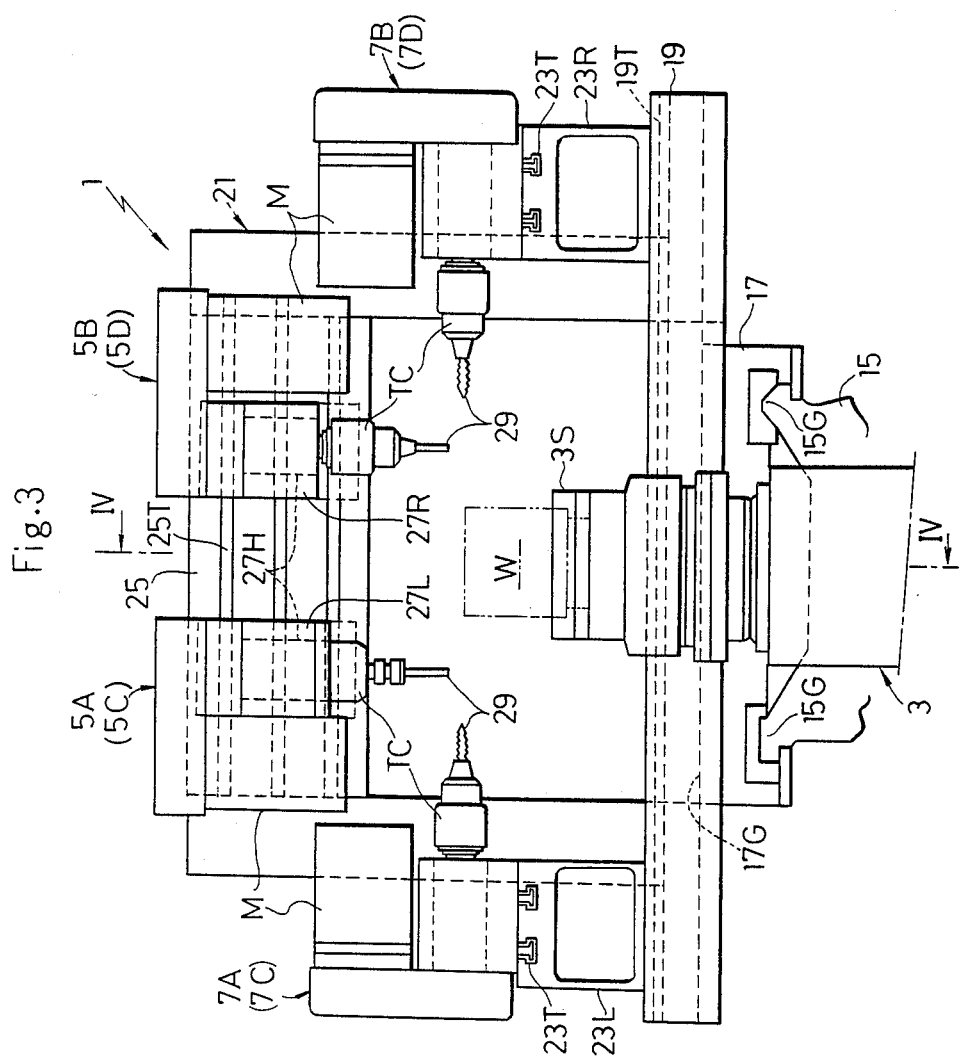
FIG. 3 is a front view of a main portion shown in FIG. 1 and is an enlarged drawing taken along the line III—III in FIG. 2.
Figure 4:
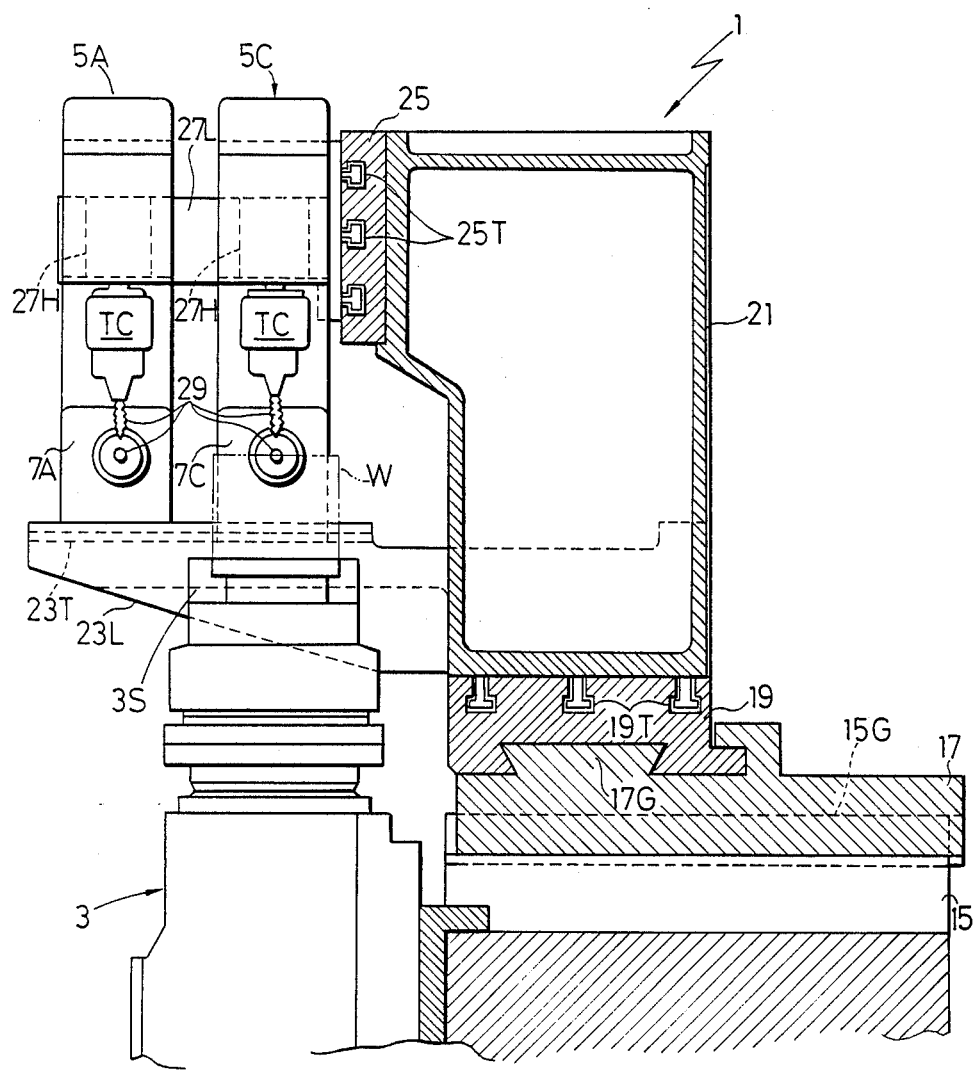
FIG. 4 is a sectional view taken along the line IV—IV in FIGS. 1 and 3.

Referring to FIGS. 3 and 4, on the top surface of the previously described base 15, there is formed a longitudinal guideway 15G which comes close to or moves away from the work supporting device 3. A slide base 17 bears freely movable on this guideway 15G. The positioning of the longitudinal movement of the slide base 17 along the guideway 15G of the base 15 is performed by the usual ball screw mechanism or rack and pinion mechanism which is driven such as by a pulse motor or a servo motor (not shown), which in turn is controlled by the numerical control device 13, the description of the details of which are omitted.

On the top surface of the above slide base 17 a lateral guideway 17G is formed, which is orthogonal to the direction of movement of the slide base 17. A tool supporting table 19 bears on this guideway 17G, and is adjusted to freely move laterally. Similarly to the above described slide base 17, the positioning of the lateral movement of the tool supporting table is performed by ball screw mechanism or rack and pinion mechanism driven such as by a pulse motor or a servo motor (not shown), which in turn is controlled by the numerical control device 13.

As shown in details in FIGS. 3 and 4, on the top surface of the above described tool supporting surface 19, there are formed a plurality of T grooves 19T extending laterally, and at the top surface of the tool supporting table 19, a gate type column 21 bearing the previously described plurality of vertical machining devices 5A-5D, and a left and right supporting base 23R and 23L bearing the previously described plurality of horizontal machining devices 7A-7D, are respectively fixed by a plurality of T bolts. More particularly, at the top front surface of the gate type column 21, an upper plate 25 having a plurality of T grooves 25T extending laterally is fixed, and at the front surface of the upper plate 25, a plurality of arm members 27R, 27L spaced laterally are secured through a plurality of T bolts, the arm members 27R, 27L being freely adjustably positioned. The above described arm members 27R, 27L, respectively, project horizontally toward the front (toward the left in FIG. 4). The previously described vertical machining devices 5A-5D mount in a plurality of vertical mounting holes 27H provided in the respective arm members 27R and 27L.

The previously described supporting bases 23R and 23L are spaced laterally and are disposed at positions close to the gate type column 21. The supporting bases 23R and 23L project towards the front from the tool supporting table 19 and the top surfaces of which are formed with a plurality of longitudinal T grooves 23T. A plurality of previously described horizontal machining devides 7A-7D bear on supporting bases 23R and 23L respectively though T bolts so as to be positioned freely adjustably.

The vertical machining devices 5A, 5B and the horizontal machining devices 7A, 7B are respectively disposed so as to lie substantially in a same vertical plane, and also the other vertical machining devices 5C, 5D and the other horizontal machining devices 7C, 7D are respectively disposed so as to lie substantially in another vertical plane. The vertical machining devices 5A-5D and the horizontal machining devices 7A-7D are respectively equipped with drive motors M and proper tool chucks TC, such as collect chucks driven by the drive motors M. The tool chucks TC dismountably and replacebly grasp working tools 29, such as cutting tools, drills, reamers, milling cutters, and other turning and grinding tools in order to perform machining on the workpiece W.

In such an arrangement as above, after mounting the workpiece W on the scroll chuck 3S of the work supporting device 3, the slide base 17 is moved in the longitudinal direction and the tool supporting table 19 is moved in the lateral direction, and thus, the proper vertical machining devices 5A-5D are positioned such as at a position over the workpiece. Then, the working tools 29 of vertical machining devices 5A-5D are operated and by moving the workpiece W a required amount upwards, a proper machining can be performed on the top surface of the workpiece W. As is apparent from the above description, by selecting various working tools 29 and by properly controlling the movements of the slide base 17 and the tool supporting table 19, it can be understood that various machining can be performed on the top surface of the workpiece.

Also, by using such a working tool as a turning tool, and by rotating the workpiece, it can be understood that a turning operation of the workpiece W is feasible.

Further, by performing machining on the workpiece W, under the selection of various working tools for the horizontal machining devices 7A-7D and under the proper control of the movements of the slide base 17 and the tool supporting table 19, it can be understood that proper machining can be performed on both the left and right sides of the workpiece W. At this time, by performing a rotary indexing on the workpiece W, it can be understood that machining can be performed on the peripheral surface of the workpiece W.

As can be seen from the description of the above embodiment, according to this invention, it can be understood that, without replacing the working tools for the machining device, using a plurality of working tools, various machining functions can be performed efficiently on the top surface and the peripheral surface of the workpiece.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A machine tool for multiple surface machining of a workpiece in which machining can be performed on a plurality of surfaces of the workpiece from a plurality of directions, comprising:

a workpiece supporting device provided on a first base and having a workpiece supporting portion which is freely rotatable and freely adjustable in a vertical direction;

said workpiece supporting portion being adapted to be indexed to a desired rotary angle;

a slide base freely adjustably movable on said first base in a horizontal direction towards and away from said workpiece supporting device;

a tool supporting table provided on said slide base, said tool supporting table being freely adjustably movable in a horizontal direction orthogonal to the direction of movement of the slide base;

a plurality of vertical surface machining devices mounted on said tool supporting table to perform vertical surface machining on a workpiece that is supported by said work supporting portion;

wherein said plurality of vertical surface machining devices are arranged in a multiple of rows in the direction of movement of the slide base and the direction of movement of the tool supporting table, respectively;

a plurality of horizontal machining devices mounted on said tool supporting table and disposed on opposite sides of the workpiece to perform machining on the workpiece from the horizontal direction;

wherein the plurality of horizontal machining devices mounted on said tool supporting table are arranged in the direction of movement of the slide base;

wherein a predetermined number of vertical machining devices and horizontal machining devices are arranged within a same plane; and further comprising a numerical control device mounted integrally with said machine tool for full automatic control of the machine tool for multiple surface machining.

2. A machine tool as claimed in claim 1, wherein said workpiece is machined on both sides thereof by the plurality of horizontal machining devices.

* * * * *